(12) United States Patent
Guan et al.

(10) Patent No.: US 8,273,309 B2
(45) Date of Patent: Sep. 25, 2012

(54) WICKING INHIBITOR FOR FLUIDIC DEVICES

(75) Inventors: Xiaosheng Guan, Beijing (CN); Min Guo, Beijing (CN); Cheng Zhou, Beijing (CN); Yuming Hu, Beijing (CN); Jing Cheng, Beijing (CN)

(73) Assignees: Capitalbio Corporation, Beijing (CN); Tsinghua University, Beijing (CN)

( * ) Notice: Subject to any disclaimer, the term of this patent is extended or adjusted under 35 U.S.C. 154(b) by 253 days.

(21) Appl. No.: 12/158,037

(22) PCT Filed: Dec. 15, 2006

(86) PCT No.: PCT/CN2006/003426
§ 371 (c)(1),
(2), (4) Date: Nov. 21, 2008

(87) PCT Pub. No.: WO2007/071165
PCT Pub. Date: Jun. 28, 2007

(65) Prior Publication Data
US 2009/0148349 A1    Jun. 11, 2009

(30) Foreign Application Priority Data

Dec. 23, 2005   (CN) .......................... 2005 1 0130707

(51) Int. Cl.
*B01L 3/00*   (2006.01)
(52) U.S. Cl. ....... 422/504; 422/68.1; 422/500; 422/501; 422/502; 422/503
(58) Field of Classification Search .................. 422/68.1, 422/500, 501, 502, 503, 504, 505, 506, 507, 422/508, 509
See application file for complete search history.

(56) References Cited

U.S. PATENT DOCUMENTS

| | | | |
|---|---|---|---|
| 4,426,451 A | 1/1984 | Columbus | |
| 6,090,251 A | 7/2000 | Sundberg et al. | |
| 6,645,432 B1* | 11/2003 | Anderson et al. | 422/100 |
| 6,750,053 B1* | 6/2004 | Widrig Opalsky et al. | 435/287.9 |
| 6,776,965 B2 | 8/2004 | Wyzgol et al. | |
| 6,819,408 B1 | 11/2004 | Scrivens et al. | |
| 6,919,058 B2 | 7/2005 | Andersson et al. | |
| 2004/0121450 A1 | 6/2004 | Pugia et al. | |
| 2005/0106752 A1 | 5/2005 | Yu et al. | |
| 2005/0249641 A1* | 11/2005 | Blankenstein et al. | 422/102 |

OTHER PUBLICATIONS

Cubaud et al., "Two-Phase Flow in Microchannels with Surface Modifications", Plenary paper, 5th International Conference on Multiphase Flow, ICMF'04, Yokohama, Japan, May 30-Jun. 4, 2004.
Finn, Acta Math. (1974) 132:199-205.
International Preliminary Report on Patentability for PCT/CN2006/003426, issued Jun. 24, 2008, 5 pages.
International Search Report for PCT/CN2006/003426, mailed on Apr. 5, 2007, 3 pages.
Seemann et al., PNAS USA (2005) 102(6):1848-1852.
Written Opinion of the International Searching Authority for PCT/CN2006/003426, mailed on Apr. 5, 2007, 4 pages.

* cited by examiner

*Primary Examiner* — In Suk Bullock
*Assistant Examiner* — Sharon Pregler
(74) *Attorney, Agent, or Firm* — Morrison & Foerster LLP

(57) ABSTRACT

The present invention relates to a wicking inhibitor for fluidic and microfluidic devices that reduces wicking by providing a structure that interrupts the flow of a working fluid through a fluidic channel interface having corner angles greater than ninety degrees.

4 Claims, 11 Drawing Sheets

(PRIOR ART)

(PRIOR ART)

(PRIOR ART)

US 8,273,309 B2

WICKING INHIBITOR FOR FLUIDIC DEVICES

TECHNICAL FIELD

The present invention relates to fluid handling devices, and more particularly to wicking inhibitors for fluidic or microfluidic devices.

BACKGROUND ART

Fluidic devices can have integrated fluid channels for directing and controlling the transport of fluids. Microfluidics, a miniaturized form of fluidics, has emerged as a new approach for improving the performance and functionality of such systems for chemical and biochemical synthesis, as well as chemical, biochemical, and medical analysis. Miniaturization and new effects in micro-scale promise completely new system solutions in these fields. Dimension reduction results in faster processes with reduced reagent and sample consumption rates. The small size scale also encourages parallel processing, in which more compounds can be produced and/or analyzed simultaneously. Massively parallel processing can speed DNA, RNA, protein, immunologic, and other tests to reduce time intervals for drug discovery and medical diagnosis. Currently, microfluidic based microanalysis systems for such applications typically have fluid channel dimensions on the order of tenths of millimeters to several millimeters, although future trends are to further reduce channel dimensions. Various microfluidic components have also been demonstrated on the same size scale, for example: micro-valves, micro-pumps, micro-flow sensors, micro-filters, micro-mixers, micro-reactors, micro-separators, and micro-dispensers, to name just a few. The book, FUNDAMENTALS AND APPLICATIONS OF MICROFLUIDICS by Nam-Trung Nguyen and Steven T. Werely, published by Artech House of Boston, U.S.A., in 2002 provides an overview of some microfluidic technologies and applications. FIGS. 1A and 1B illustrated exploded and assembled perspective views of a fluidic or microfluidic device composed of a body component 101 to which a cover component 103 is affixed. Body component 101 contains channels 102 and other fluidic or microfluidic components formed therein.

In fluidic systems, and microfluidic systems in particular, it is often desirable to have flowing liquid segments with sharply defined frontal and trailing boundaries along channels. Such sharply defined boundaries minimize spatial dispersion during fluid flow and allow for more precisely defined timing for synthesis and/or analysis operations in such systems. "Wicking" as a result of capillary action between a working fluid and containment walls of a fluid transport channel, and in particular at the edges where containment walls meet, can spread out both frontal and trailing boundaries of the working fluid. Wicking tends to be exacerbated when a fluid and a channel wall have a higher degree of affinity for one another, for example in the case of an aqueous solution and a hydrophilic surface.

Various prior art approaches have been used to implement wicking inhibitor structures or "traps" to reduce wicking in channels and/or other structures. U.S. Pat. No. 6,919,058, RETAINING MICROFLUIDIC MICROCAVITY AND OTHER MICROFLUIDIC STRUCTURES, issued to Per Andersson, et al. on Jul. 19, 2005 (hereinafter "Andersson"), describes a wicking trap as illustrated in top and side cross-sectional views in FIGS. 2A and 2B, respectively. A fluidic channel 201 is defined by side and bottom walls in a first microfluidic component 101. A top bottom wall is defined by a second, top cover, component 103, that is bonded to the first component. Section 202 designates a region where the side walls have been surface treated so that they have less affinity for a fluid to be transported, thereby reducing capillary action and associated wicking. One difficulty of this approach is that such surface treatment requires an additional fabrication step for the fluidic device that adds cost, and is often difficult. FIGS. 3A and 3B respectively illustrate top and side cross-sectional views of another wicking trap embodiment described by Andersson. In this embodiment, channel wall recesses 301 are formed in the sidewalls of channel 201. These recesses tend to reduce wicking by interrupting capillary action at their corners. FIGS. 4A and 4B respectively illustrate top and side cross-sectional views of another wicking trap described by Andersson. In this embodiment, sidewall protuberances 401 extend into channel 201. These protuberances likewise can reduce wicking by interrupting capillary action.

U.S. Pat. No. 6,776,965, STRUCTURES FOR PRECISELY CONTROLLED TRANSPORT OF FLUID issued to Wyzgol et al. on Aug. 17, 2004 (hereinafter "Wyzgol"), presents the anti-wicking structure illustrated by FIGS. 5A and 5B in respective cross-sectional top and side views. In this embodiment, the bottom wall of the structure has a series of steps formed therein to reduce wicking by interrupting capillary action at their edges.

FIG. 6 shows a cross-sectional side view (normal to direction of fluid transport in a channel) that illustrates a feature common to all of these prior art embodiments. Where a channel surface of a sidewall 801 (or other structure formed by a sidewall) intersects with a channel surface of a top wall 802 formed by a cover as described above, an edge is formed with a ninety degree angle.

A requirement for capillary action at an edge of a channel formed, in part, by the intersection of two surfaces is known as the "Concus-Finn Condition" (R. Finn, *Equilibrium Capillary Surfaces*, Springer-Verlag, New York, 1987; R. Finn, *A note on the capillary problem*, Acta Math., 132 (1974) 199-205), which can be stated that if the contact angle of a fluid on a surface, and a half-angle of a corner formed by the intersection of two such surfaces exceeds ninety degrees, then the fluid will not wick along the corner. FIGS. 7A and 7B illustrate contact angles ✓ for a fluid 601 in contact with a surface 602, for low affinity and high affinity fluid/surface combinations, respectively. Especially for the case of fluids comprising aqueous solutions in contact with hydrophilic surfaces (a high affinity combination) we would expect ✓ to be small, for example in the ninety degree to zero to ninety degree range. FIG. 8 illustrates fluid meniscus 702 at an edge formed by the intersection of two wall surfaces 701 and 702. The corner angle between the intersecting wall surfaces is $\ell$ and the half angle is $\ell_c$. The Concus-Finn Condition for no wicking in terms of these variable is: ✓+$\ell_c$>90°.

All of the prior art embodiments discussed above have a corner angle of substantially 2$\ell_c$=90° as discussed above in connection with FIG. 6. Therefore the Concus-Finn Condition for no wicking requires that the fluid/surface contact angle ✓ should be greater than 45°. This condition limits the extent to which a fluid and a fluidic surface can have an affinity for one another without wicking, thereby limiting the usefulness of the prior alt wicking structures discussed above.

SUMMARY OF THE INVENTION

Embodiments of the present invention provide wicking inhibitor devices for fluidic and microfluidic devices having corner angles that are all greater than 90°. According to some embodiments the corner angles are 270°. Two layer assemblies of embodiments are described in which a first layer has a fluidic channel and part of the wicking inhibitor formed therein, and a second layer has another part of the wicking inhibitor formed therein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

FIGS. 9A and 6B present respective exploded and assembled perspective views of an embodiment of the current invention.

FIGS. 1-6 and 9-11 are labeled with coordinate axes that cross reference orientations and views among the figures. When the text herein refers to "top," it refers to a drawing aspect presenting itself as viewed from the positive y-axis direction. When the text refers to "bottom," it refers to a drawing aspect presenting itself as viewed from the negative y-axis direction. Although the axes shown are in particular orientations in the drawings, the actual physical structures illustrated may be rotated to any particular orientation without performance impact, as long as component alignments are maintained and unless otherwise stated.

Figure 1A:
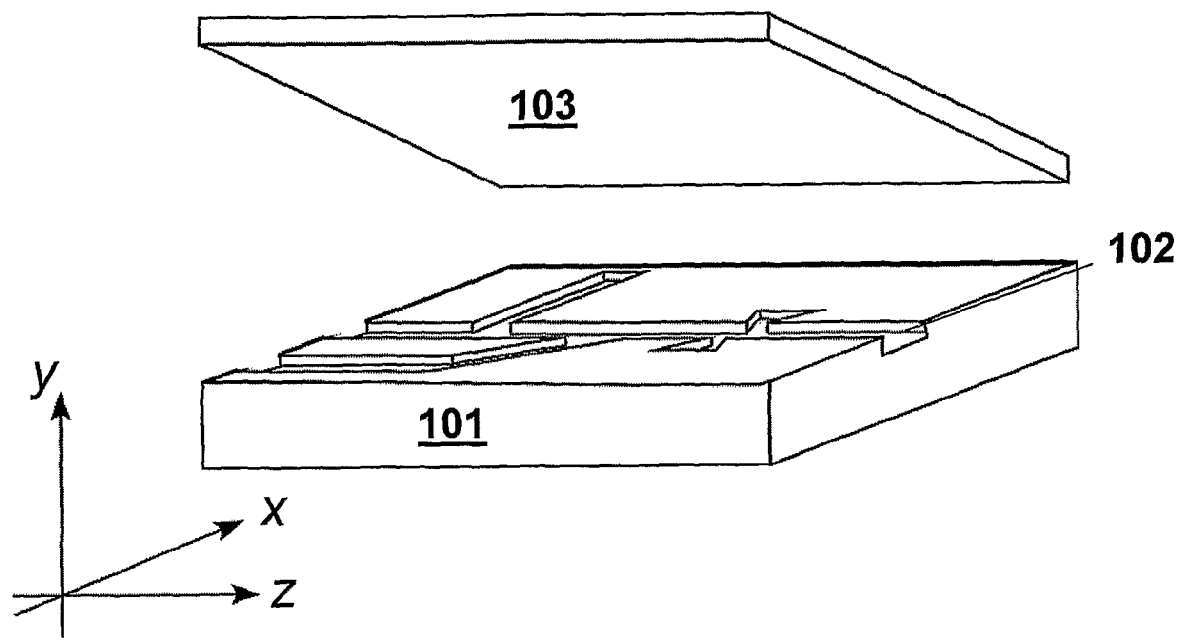
FIG. 1A illustrates an exploded perspective view of a fluidic device.
Figure 1B:
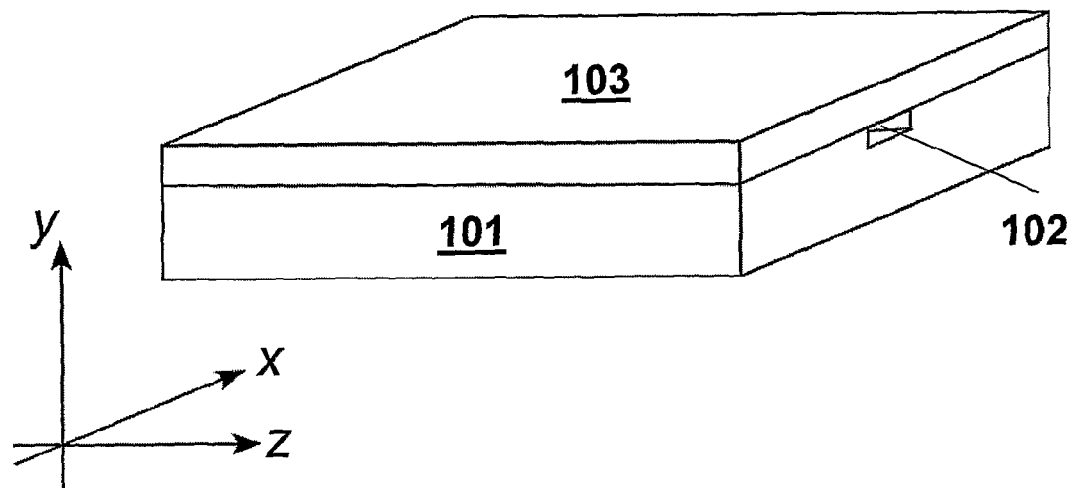
FIG. 1B illustrates an assembled perspective view of the device.
Figure 2A:
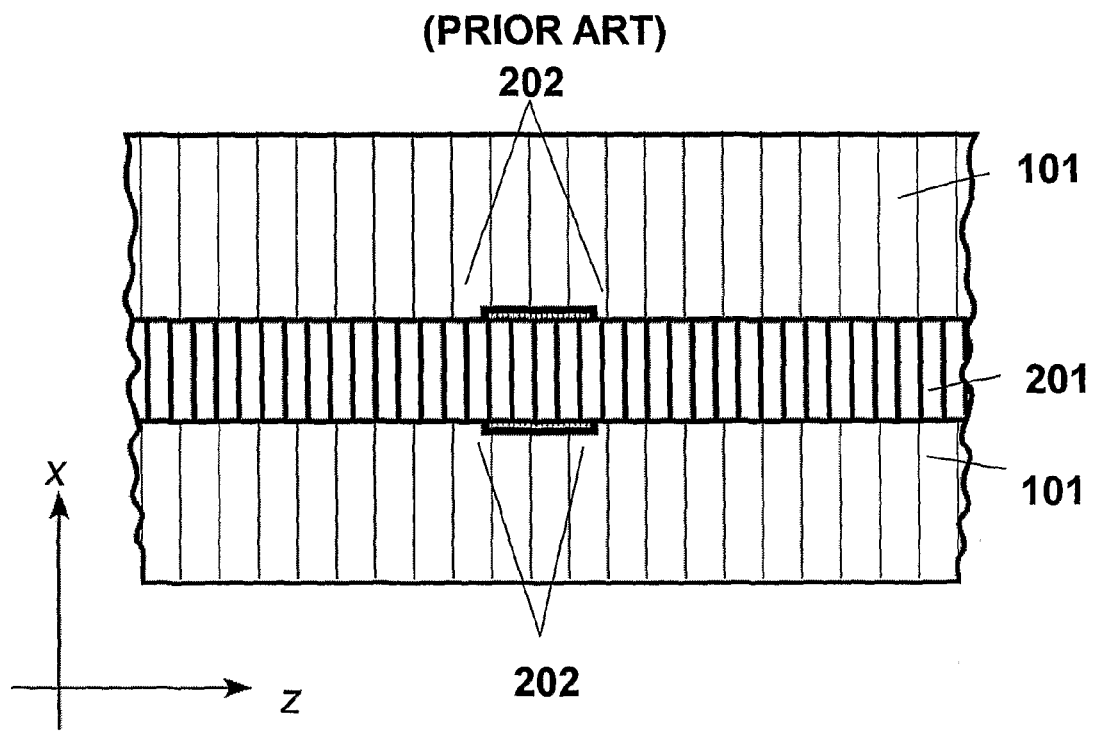
FIGS. 2A and 2B respectively present top and side cross-sectional views of a prior art wicking inhibitor embodiment for a fluidic device.
Figure 2B:
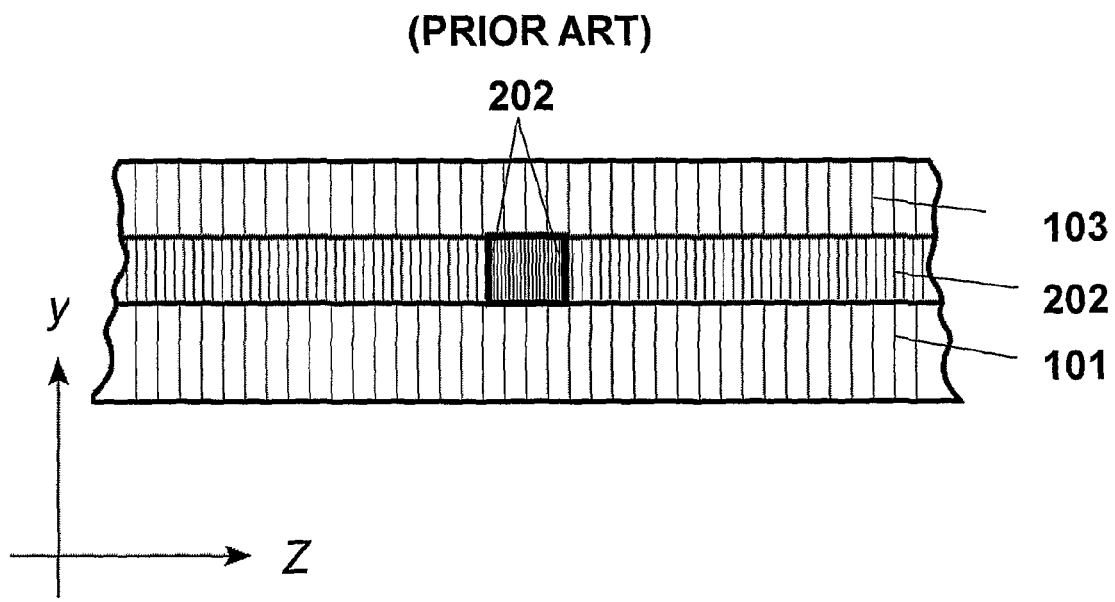
Figure 3A:
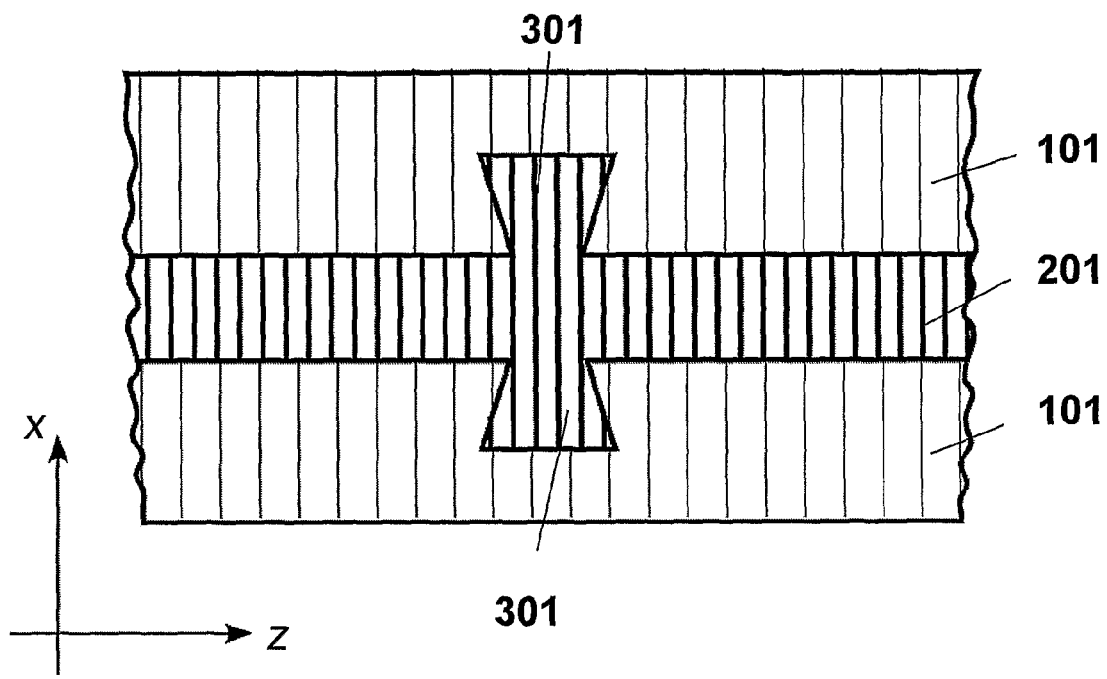
FIGS. 3A and 3B respectively present top and cross-sectional views of another prior art wicking inhibitor embodiment for a fluidic device.
Figure 3B:
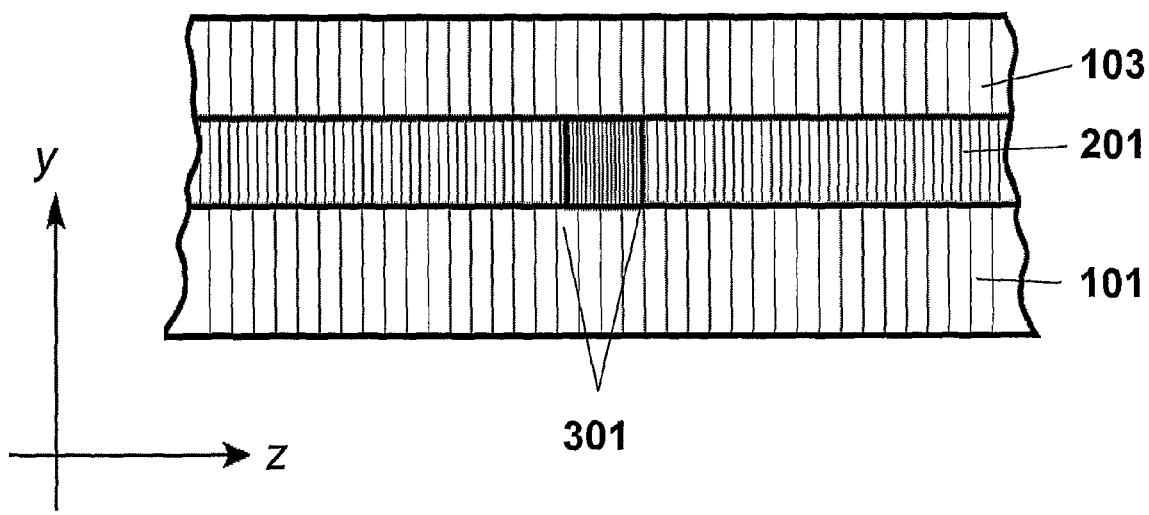
Figure 4A:
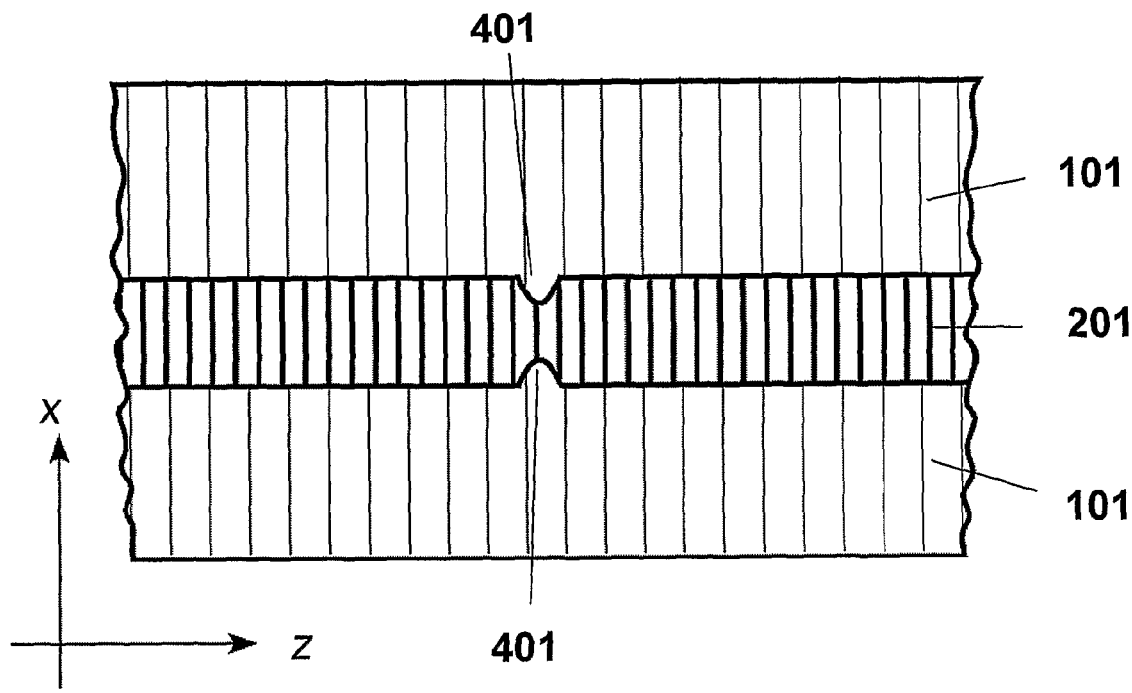
FIGS. 4A and 4B respectively present top and cross-sectional views of yet another prior art wicking inhibitor embodiment for a fluidic device.
Figure 4B:
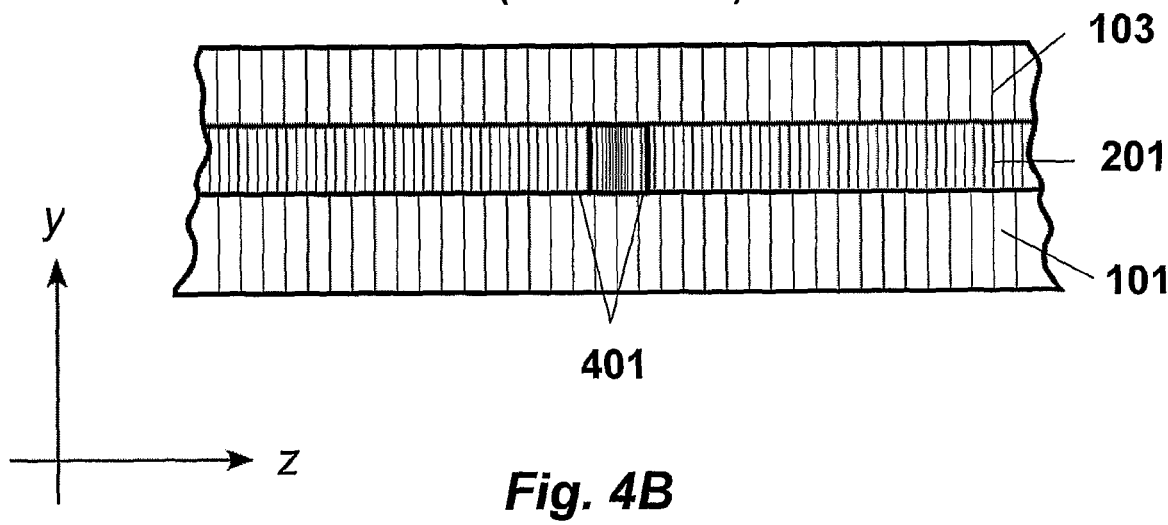
Figure 5A:
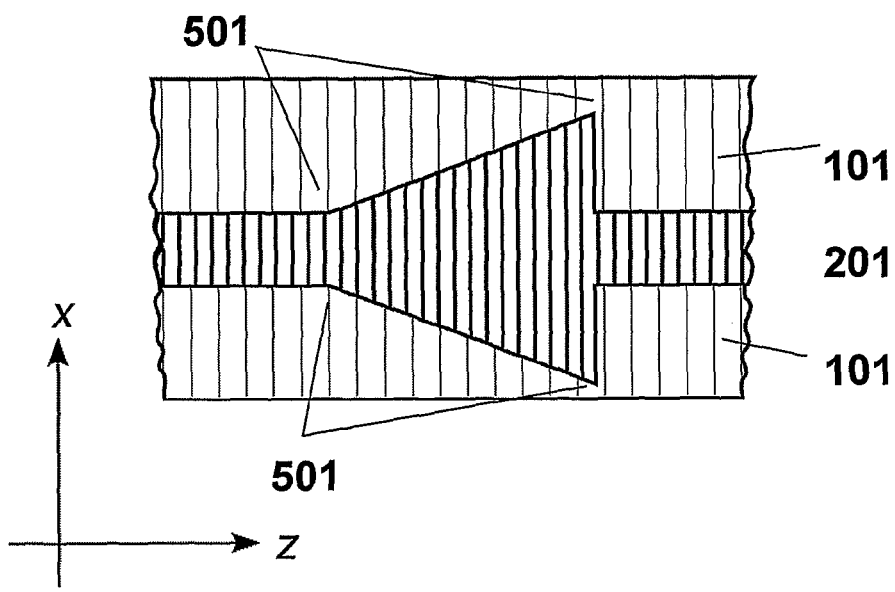
FIGS. 5A and 5B respectively present top and cross-sectional views of an additional prior art wicking inhibitor embodiment for a fluidic device.
Figure 5B:
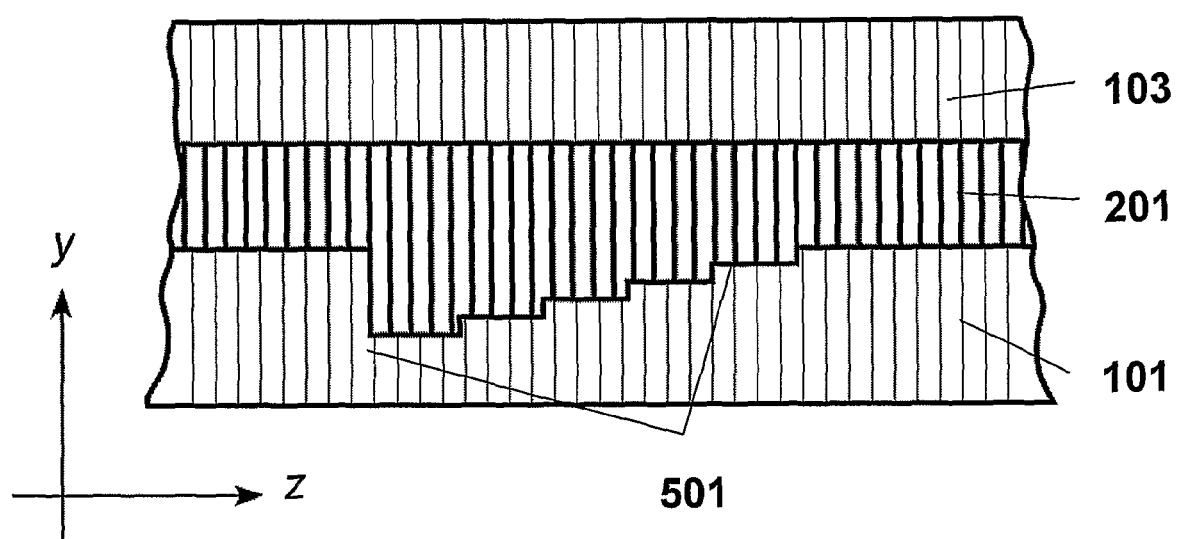

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Commonly designated elements among the various figures refer to common or equivalent elements in the depicted embodiments. The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

As used herein, "a" or "an" means "at least one" or "one or more."

Embodiments of the microfluidic wicking inhibitor can be made using techniques that are commonly used to make microfluidic devices and systems. Such techniques span a variety of diverse materials, fabrication, and assembly methods. Materials can be organic or inorganic, and be hydrophobic or hydrophilic to differing extents. A combination of different materials can be used in the same microfluidic device or system. Fabrication methods can be specific to specific types of materials, and can include photolithography; physical, wet, and dry-chemical etching; subtractive and additive material transfer; non-optical transfer printing; contact molding; injection molding; casting; micro-stereo lithography; and micro-machining. Assembly methods can include: anodic, direct, adhesive, and eutectic bonding; and press-fit. The selection of fabrication and assembly methods can affect the choice of microfluidic device and system design variations, or vice versa. This will be discussed below in connection with various embodiments of the wicking inhibitor.

As discussed above, various materials, fabrication methods, and assembly techniques can be used in the fabrication of microfluidic devices. The present discussion will focus on a subset of these in relation to embodiments of the current invention for the sake of focus and brevity, although further equivalent embodiments using other materials, fabrication methods, and assembly techniques would be apparent to one of ordinary skill in the art after reading the disclosure.

Inorganic materials include silicon, glasses, metals, and metal alloys. Glass is principally amorphous silicon dioxide ($SiO_2$) with varying amounts of additional elements in different types of glass. Among the desirable properties of glass for microfluidic device substrates are mechanical strength, dimensional stability, and low cost. A substrate of glass can form an active layer by having channels and other microfluidic structure formed in its surface, or it may merely serve as a mechanical support for active layers of other materials. Surface structures may be formed in glass by wet or dry chemical etching, mechanical ablation or milling, molding, and micromachining. Glass surfaces tend to be hydrophilic.

Typical polymer materials for other microfluidic device layers include thermosetting polymers such as polydimethylsiloxane (PDMS), as well as thermoplastic polymers such as: (i) polymethylmethacrylate (PMMA); (ii) polycarbonate (PC); (iii) polyoxymethylene (POM); and polyamide (PA).

PDMS has an inorganic siloxane backbone with organic methyl groups attached to the silicon. Both prepolymers and curing agents are commercially available. PMDS has a low interfacial free energy, which provides a relatively chemically unreactive, hydrophobic surface, although this can be modified with plasma treatment. PDMS is stable against temperature and humidity. PDMS is transparent, allowing for the visual examination of microfluidic structures and their operations. PDMS is flexible, so it can conform to nonplanar structures. PDMS is optically curable, so micro-stereo lithography can be used to form PDMS microfluidic structures, although PDMS structures can also be cast molded by applying a prepolymer solution to a mold, curing at an elevated temperature, and subsequently peeling the PMDS structure from the mold. The cast molding technique is capable of fabricating relief features down to the order of tens of microns across and deep, and is particularly low cost and does not require large capital investments in manufacturing equipment.

Structures can be formed in the thermoplastic polymers by using compression molding, injection molding, or micro-stereo lithography. Compression molding involves heating the polymer above its glass transition temperature and pressing it against a mold to form relief features, similar to the cast molding technique described in the previous paragraph. Injection molding involves heating the polymer above its glass transition temperature and pressure injecting it into a mold. After cooling, the mold is dismantled, and the molded part is removed.

All of the above fabrication techniques tend to create microfluidic layers with surface features formed in relief. Thus blind holes can be formed, but through holes can require further processing. Through holes (and other through structures) can be drilled by a variety of techniques, such as: (i) laser micro-machining using excimer, Nd:YAG, or $CO_2$ lasers; (ii) focused ion beam; (iii) micro-electric discharge; (iv) powder blasting; (v) ultrasonic micro-machining; or (vi) reduced-scale mechanical machining, all of which are well known to one of ordinary skill in the art.

Layers and substrate layers as discussed above can be assembled into microfluidic devices and systems using direct or adhesive bonding.

For direct bonding, the surfaces of layers to be bonded are cleaned and the layers are aligned relative to one another and pressed together to form a sandwiched structure. Thermoplastic polymers can be bonded together by heating to temperatures above their glass transition temperature. In cases of thermosetting polymers with low surface energy such as PMDS, layers can be bonded together under pressure at room temperature. PMDS layers can also bond to glass under similar conditions. Another method to bond layers together is wet bonding. In wet bonding, the surfaces to be bonded are wetted with a solvent, and then pressed together. Bonding is accomplished after evaporating the solvent.

Adhesive bonding uses an intermediate layer to glue layers together. Depending on substrate and layer materials, the intermediate adhesive layer can comprise epoxies, photoresists, or other polymers. The intermediate adhesive layer can be applied to a surface to be bonded, through a removable mask, in order to exclude adhesive from microfluidic structures, as necessary. Techniques for such selective application are well known to one of ordinary skill in the art. Some adhesive layers can be cured by ultraviolet light, while other adhesive layers can be chemically cured, or cured at elevated temperatures.

The embodiment presented here, will describe embodiments using a two layer structure, without loss of generality.

Figure 6:
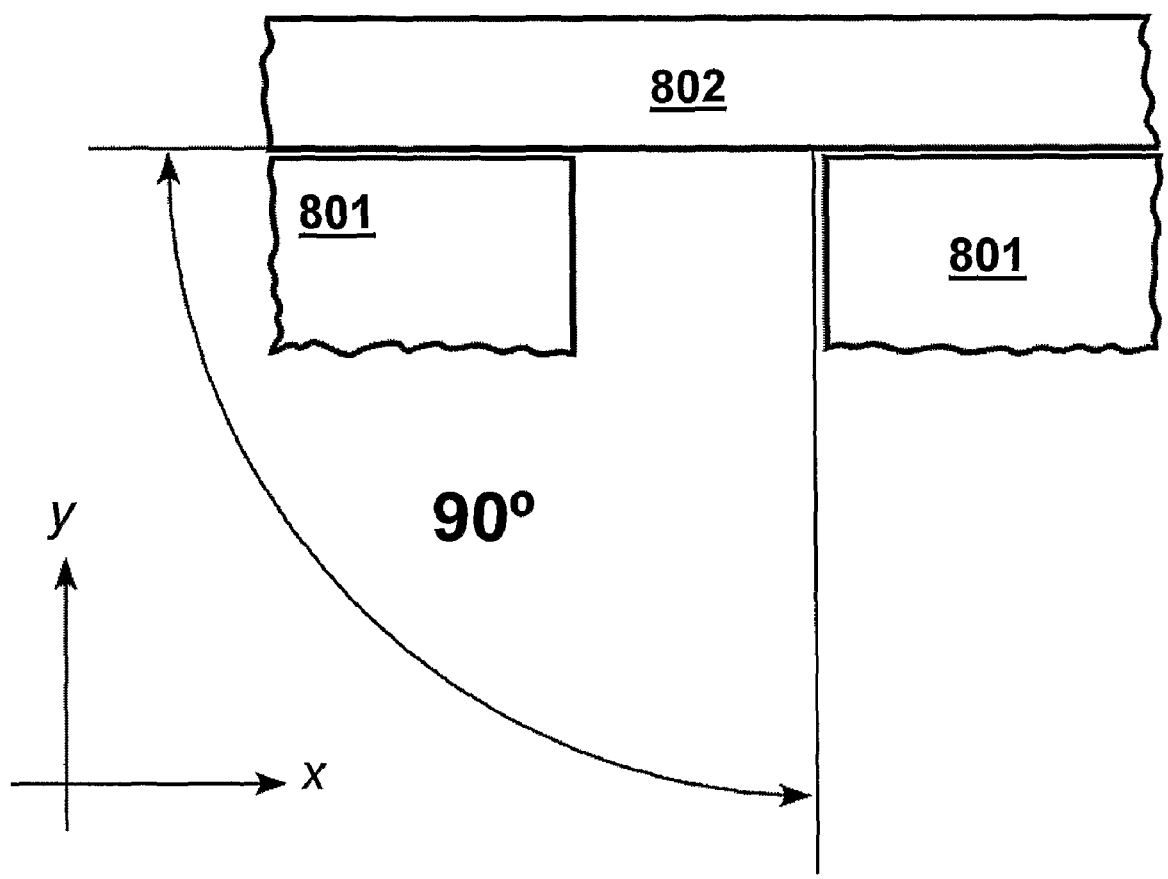
FIG. 6 illustrates a ninety degree angle of surface intersection common to all prior art wicking inhibitor embodiments.
Figure 7A:
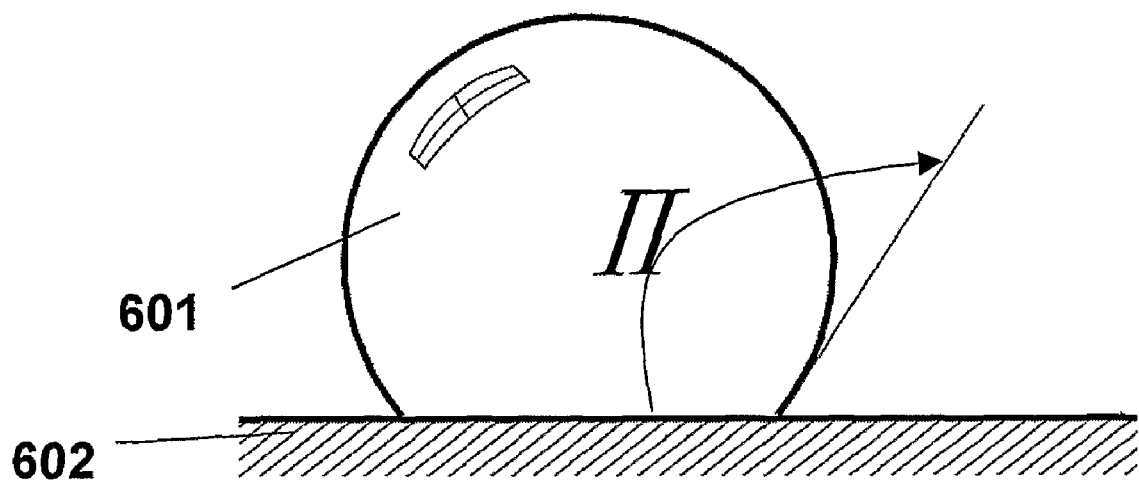
FIGS. 7A and 7B illustrate a droplet of aqueous solution wetting hydrophobic and hydrophilic surfaces, respectively, with corresponding contact angles $\checkmark$.
Figure 7B:
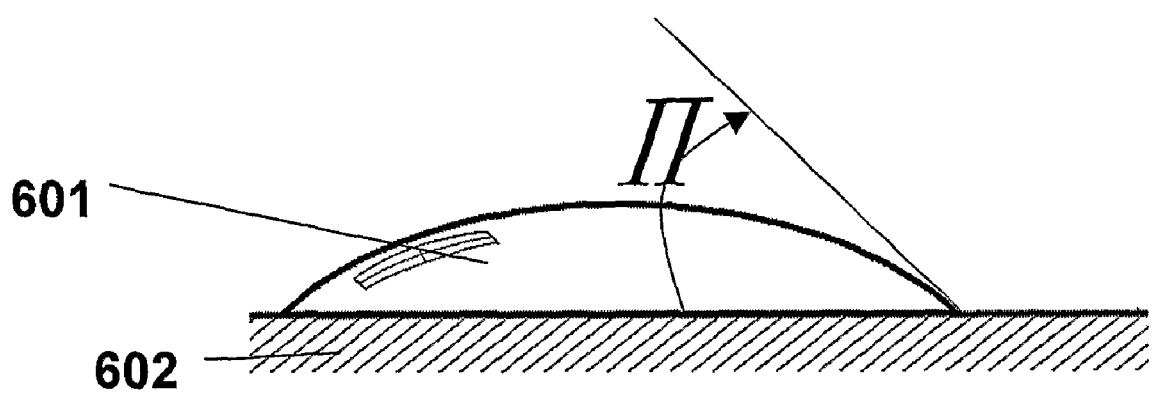
Figure 8:
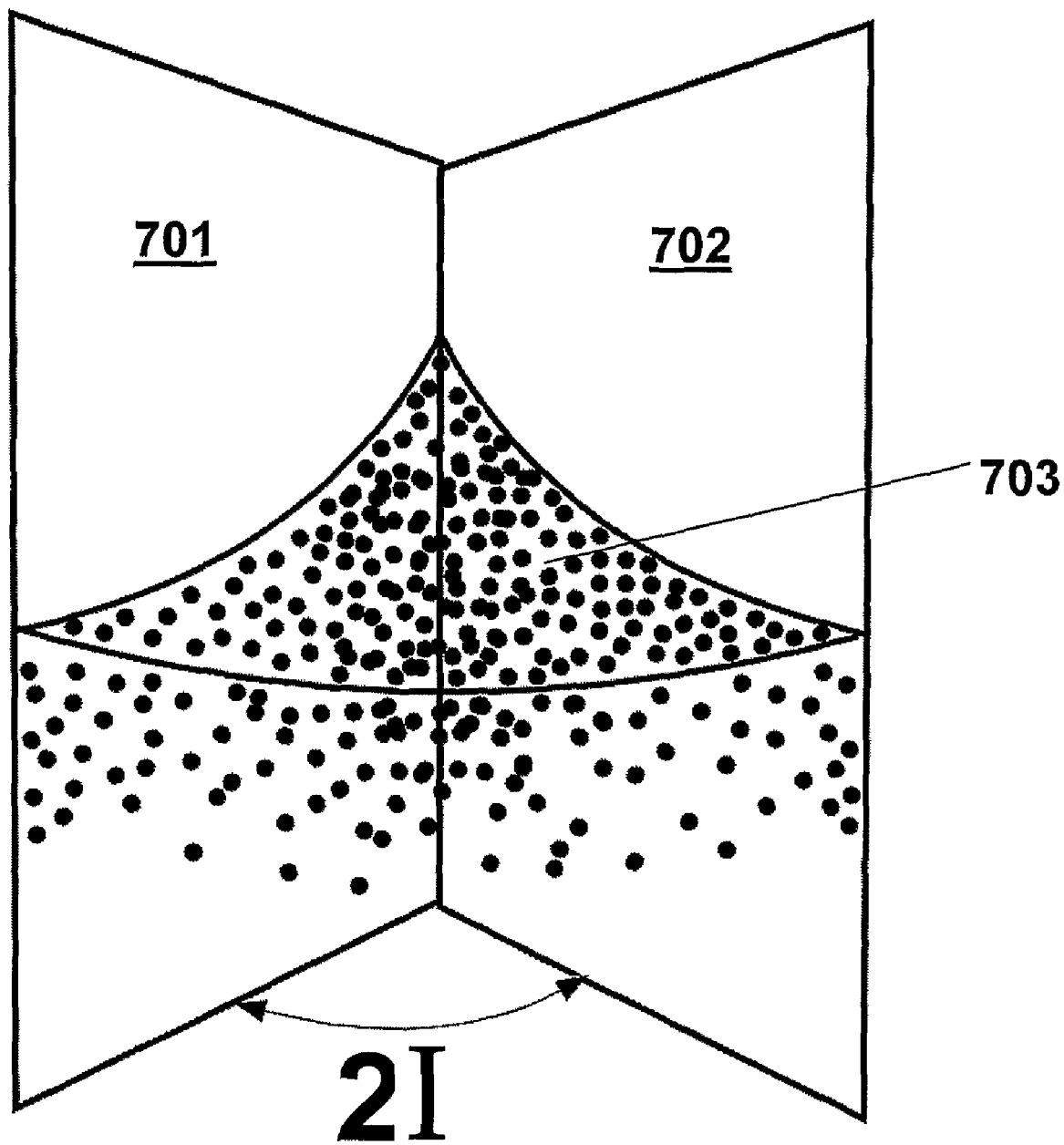
FIG. 8 illustrates a meniscus between two intersecting planar surfaces, with a corresponding corner angle of $2\textit{f}$.
Figure 9A:
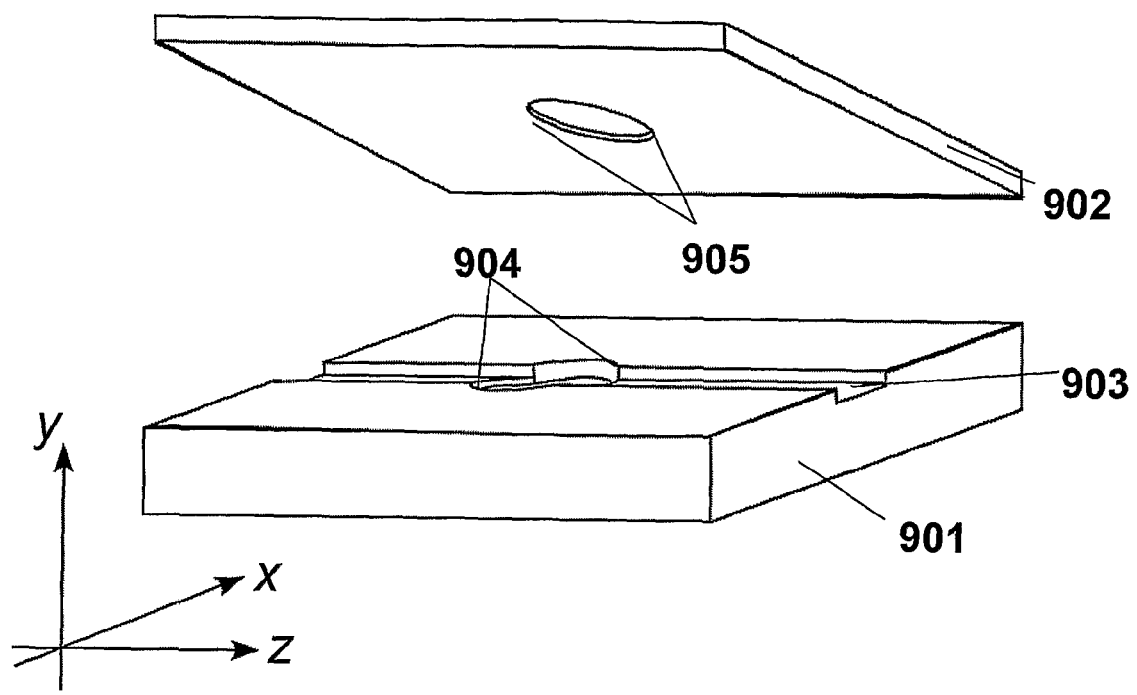
Figure 9B:
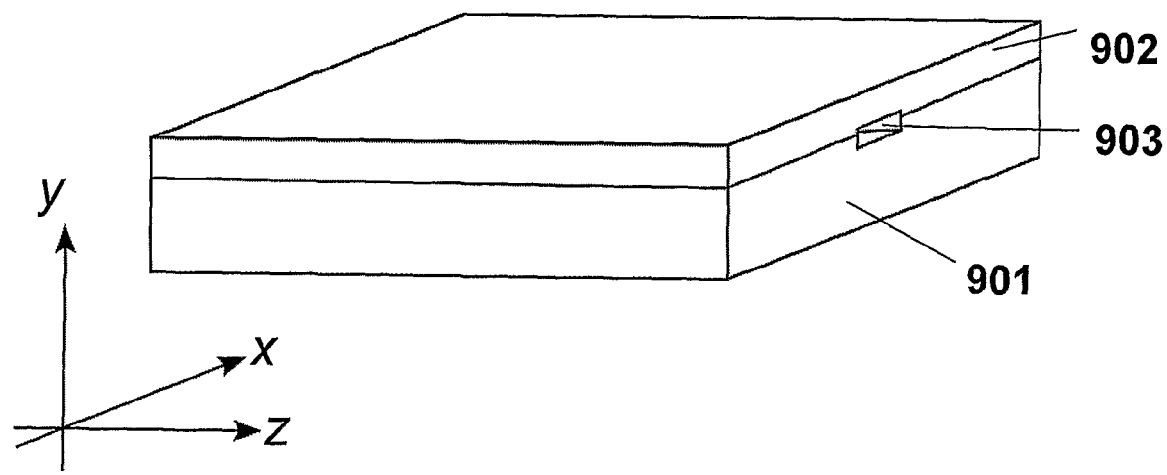
Figure 11A:
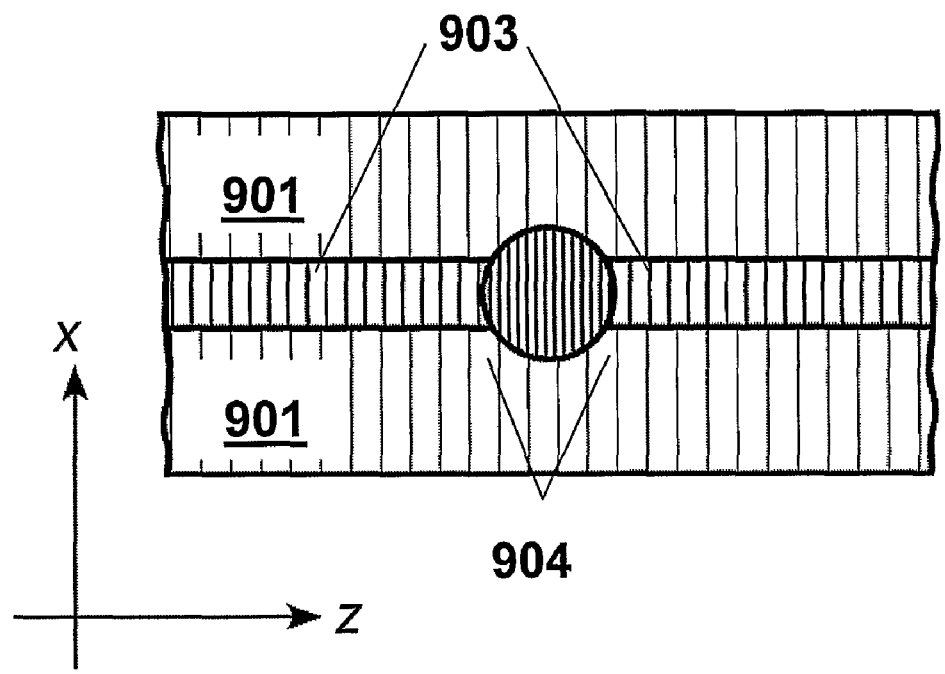
FIGS. 11A and 11B present two views of a second component according to an embodiment of the invention.
Figure 11B:
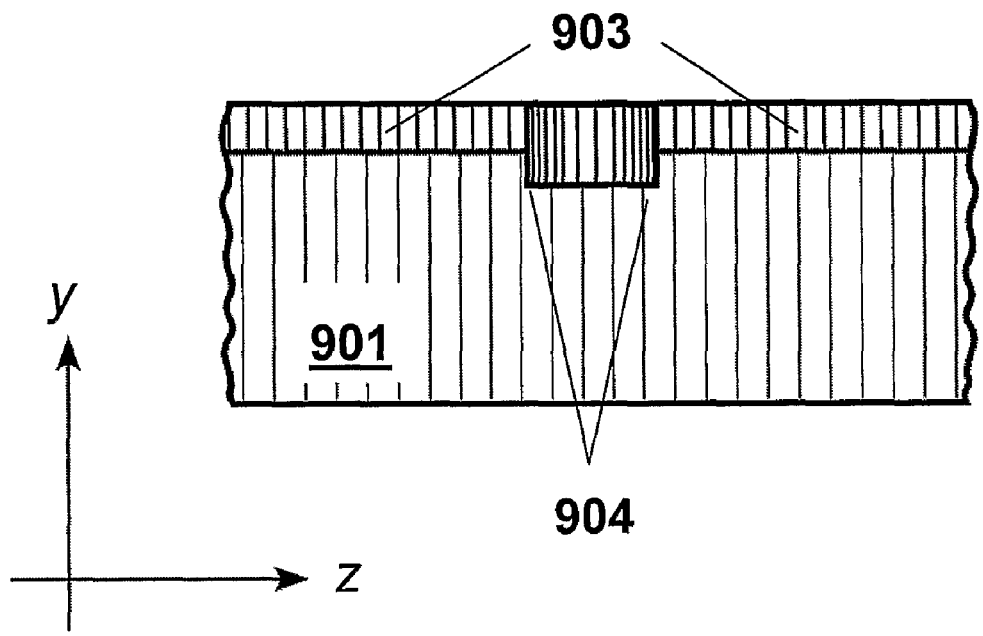

FIGS. 9A and 6B present respective exploded and assembled perspective views of an embodiment of the current invention having first and second layers 901 and 902, respectively, that can be bonded together as discussed above. Layer 1 has a recessed region formed therein comprising side and bottom walls for a fluidic channel 903. Region 904 is also formed therein to interrupt the fluidic channel and serve as a first part of a wicking inhibitor according to the embodiment. As best viewed in top and side cross-sectional views of layer 1 shown in FIG. 11A and FIG. 11B, region 904 has a bottom wall that is recessed below the bottom wall of channel 903.

Second layer 902 provides a top channel wall for channel 903 when assembled with first layer 901. Second layer 902 has recess 905 formed therein, as best viewed in bottom and side cross-sectional views of layer 2 shown in FIG. 10A and FIG. 10B, respectively, that serves as a second part of a wicking inhibitor according to the embodiment. The sidewalls of region 105 are configured to substantially align with the side walls of region 904 when layers 902 and 901 are assembled. The recessed top of region 905 provides a top wall for the wicking inhibitor that is elevated above the channel top wall provided by the bottom surface of layer 902.

When layers 1 and 2 are assembled so that region 904 is substantially aligned with region 905, a fluidic channel is formed having a wicking trap comprising regions 904 and 905. A wall corner angle of substantially 270° is thereby formed by the fluidic inhibitor and the fluidic channel interfaces. This fluidic inhibitor embodiment thus overcomes the 90° corner angle limitation of the prior art described above, and expands the choice of fluidic device wall materials that can be used while minimizing the wicking of working fluids.

Figure 10A:
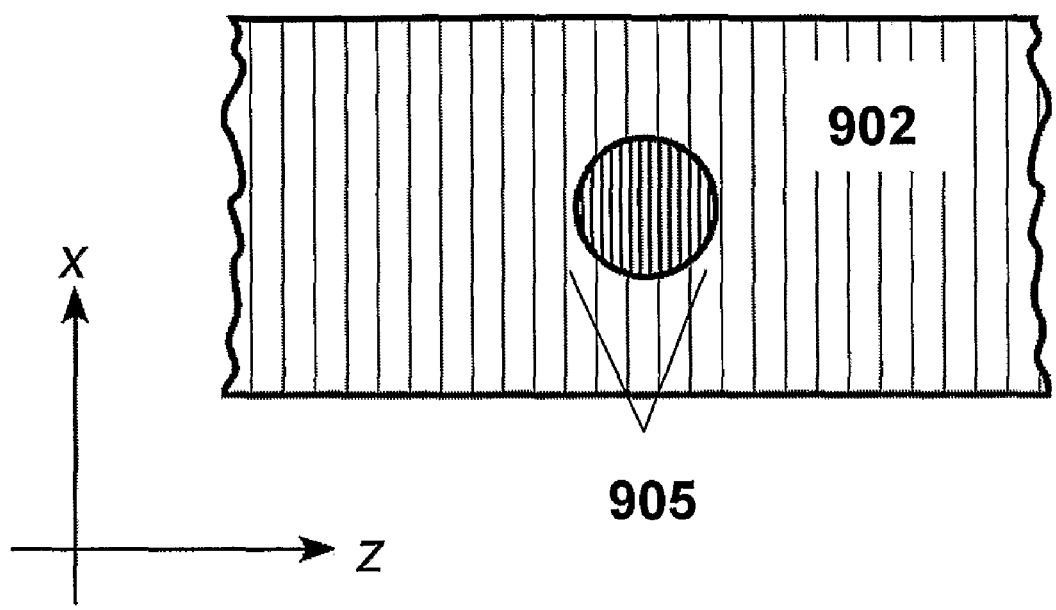
FIGS. 10A and 10B present two views of a first component according to an embodiment of the current invention.
Figure 10B:
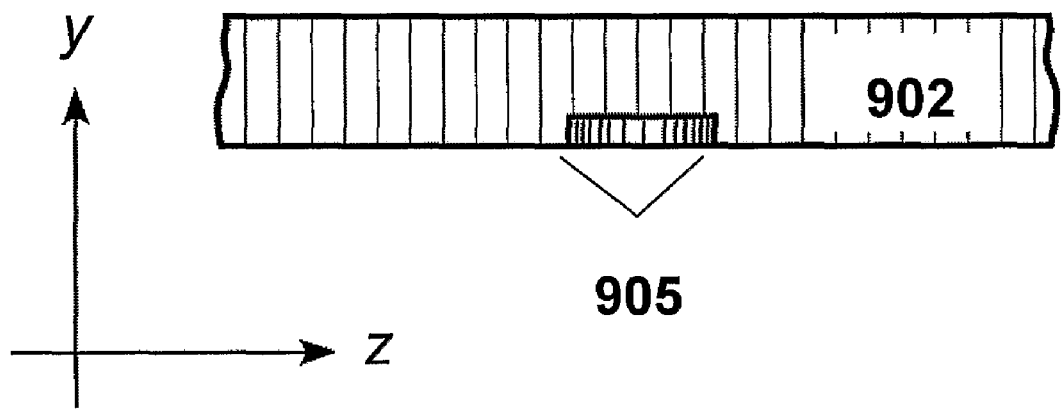

Rectangular cross-sections for channels have been illustrated in FIGS. 10A and 10B in connection with the above described embodiments. Other channel cross sections (such as circular, semi-circular, elliptical, square or rectangular, or polygonal—to name a few) will be apparent to one of ordinary skill in the art after studying this disclosure. Circular wicking inhibitor cross-sections (parallel to the direction of working fluid flow) have been illustrated in connection with the above described embodiments. Other wicking inhibitor cross sections will be apparent to one of ordinary skill in the art after studying this disclosure. Some of these alternative cross-sections can provide lesser corner angles, or greater corner angles, sometimes at a decrease or increase in fabrication difficulty and/or yield. Actual corners of a fabricated structure may have some degree of rounding, without substantially affecting the performance of the wicking inhibitor. Embodiments comprising two-layer assemblies have been described, although embodiments having fewer or more layers will be apparent to one of ordinary skill in the art after studying this disclosure.

It should be understood that the invention can be practiced with modification and alteration within the spirit and scope of the appended claims. The description is not intended to be exhaustive or to limit the invention to the precise form disclosed, nor to limit the invention to the exemplary uses described. It should be understood that the invention can be practiced with modification and alteration and that the invention be limited only by the claims and the equivalents thereof.

The invention claimed is:

1. A wicking inhibitor configured for fluid communication with a fluidic channel, both being configured to accept the flow of a working fluid therethrough, comprising an interface between the fluidic channel and another fluidic structure, wherein all edges of the interface are configured to have corner angles greater than ninety degrees, wherein the fluidic channel and the fluidic structure are both part of a fluidic device comprising:
   a first layer,
   the first layer further comprising a first recess formed therein defining first, second, and third walls of the fluidic channel, wherein the first and second walls are parallel to one another and both are perpendicular to the third wall, and the first layer further comprising a second recess formed therein defining a first cavity region for the wicking inhibitor, the first cavity region having a fourth wall and a fifth wall, the fifth wall having first and second segments that are circumferential to the second recess and perpendicular to the fourth wall, wherein the fourth wall of the second recess extends beyond the third wall of the first recess, wherein the first and second segments of the fifth wall adjoin the first and second walls, respectively; and a second layer, the second layer further comprising a sixth wall to define the fluidic channel that is parallel to third wall, and the second layer further comprising a recess formed therein defining a second cavity region for the wicking inhibitor, the second cavity region comprising a sixth wall and a seventh wall, the seventh wall being circumferential to the recess and perpendicular to the sixth wall, wherein the seventh wall is configured to align with the first and second segments of the fifth wall.

2. The wicking inhibitor of claim 1, wherein at least one of the corner angles is configured to have a corner angle that is substantially two hundred seventy degrees.

3. The wicking inhibitor of claim 1, wherein at least one of the first and second layers is formed of a hydrophilic material.

4. The wicking inhibitor of claim 1, wherein the first and second layers are bonded together.

* * * * *

UNITED STATES PATENT AND TRADEMARK OFFICE
CERTIFICATE OF CORRECTION

PATENT NO. : 8,273,309 B2
APPLICATION NO. : 12/158037
DATED : September 25, 2012
INVENTOR(S) : Xiaosheng Guan et al.

It is certified that error appears in the above-identified patent and that said Letters Patent is hereby corrected as shown below:

In the Specification at column 1, under the title, insert the following paragraph:

--Cross-Reference to Related Applications

This application is the national phase of PCT application PCT/CN2006/003426 having an international filing date of December 15, 2006, which claims priority from China application number 200510130707.5 filed December 23, 2005. The contents of these documents are incorporated herein by reference.--

Signed and Sealed this
Nineteenth Day of March, 2013

Teresa Stanek Rea
*Acting Director of the United States Patent and Trademark Office*